United States Patent
Yu et al.

(10) Patent No.: US 11,275,996 B2
(45) Date of Patent: Mar. 15, 2022

(54) SYSTEMS AND DEVICES FOR FORMATTING NEURAL NETWORK PARAMETERS

(71) Applicants: ARM Ltd., Cambridge (GB); The Regents of the University of Michigan, Ann Arbor, MI (US)

(72) Inventors: Jiecao Yu, Ann Arbor, MI (US); Andrew Lukefahr, Ann Arbor, MI (US); David Palframan, Austin, TX (US); Ganesh Dasika, Austin, TX (US); Reetuparnda Das, Ann Arbor, MI (US); Scott Mahlke, Ann Arbor, MI (US)

(73) Assignees: ARM Ltd., Cambridge (GB); The Regents of the University of Michigan, Ann Arbor, MI (US)

( * ) Notice: Subject to any disclaimer, the term of this patent is extended or adjusted under 35 U.S.C. 154(b) by 1021 days.

(21) Appl. No.: 15/629,394

(22) Filed: Jun. 21, 2017

(65) Prior Publication Data
US 2018/0373978 A1   Dec. 27, 2018

(51) Int. Cl.
*G06N 3/08*   (2006.01)
*G06F 17/11*   (2006.01)
*G06N 3/10*   (2006.01)

(52) U.S. Cl.
CPC ............... *G06N 3/08* (2013.01); *G06F 17/11* (2013.01); *G06N 3/10* (2013.01); *G06N 3/082* (2013.01)

(58) Field of Classification Search
CPC . G06N 3/08; G06N 3/10; G06N 3/082; G06F 17/11
See application file for complete search history.

(56) References Cited

U.S. PATENT DOCUMENTS

| | | | | |
|---|---|---|---|---|
| 5,734,797 A * | 3/1998 | Deangelis | ............... | G06N 3/082 706/15 |
| 7,444,282 B2 * | 10/2008 | Choo | ....................... | G10L 15/04 704/201 |
| 8,700,552 B2 * | 4/2014 | Yu | ............................ | G06N 3/08 706/25 |
| 9,477,482 B2 * | 10/2016 | Qiu | ....................... | G06F 9/3869 |
| 2003/0011492 A1 * | 1/2003 | Owen | .................... | G08G 1/015 340/941 |
| 2005/0197977 A1 * | 9/2005 | Buck | ..................... | G06N 3/063 706/12 |

(Continued)

FOREIGN PATENT DOCUMENTS

WO   WO-2018053835 A1 *   3/2018   ............... G06N 3/02

OTHER PUBLICATIONS

EIE: Efficient Inference Engine on Compressed Deep Neural Network Han et al. (Year: 2012).*

(Continued)

*Primary Examiner* — Eric Nilsson
*Assistant Examiner* — Ababacar Seck
(74) *Attorney, Agent, or Firm* — Berkeley Law & Technology Group, LLP

(57) ABSTRACT

Subject matter disclosed herein may relate to storage of signals and/or states representative of parameters in a computing device, and may relate more particularly to storage of signals and/or states representative of neural network parameters in a computing device.

20 Claims, 6 Drawing Sheets

(56) References Cited

U.S. PATENT DOCUMENTS

| | | | |
|---|---|---|---|
| 2010/0211536 A1* | 8/2010 | Al-Fattah | E21B 49/00 706/21 |
| 2015/0067009 A1 | 3/2015 | Strauss et al. | |
| 2015/0088926 A1* | 3/2015 | Chavan | G06F 3/0689 707/769 |
| 2016/0358068 A1* | 12/2016 | Brothers | G06N 3/082 |
| 2016/0358070 A1* | 12/2016 | Brothers | G06N 3/0454 |
| 2018/0046906 A1* | 2/2018 | Dally | G06F 7/5443 |
| 2018/0082181 A1* | 3/2018 | Brothers | G06N 3/0454 |
| 2018/0121386 A1* | 5/2018 | Chen | G06F 9/3851 |
| 2018/0300600 A1* | 10/2018 | Ma | G06N 3/063 |

OTHER PUBLICATIONS

Song, Han et al., "Deep Compression: Compressing Deep Neural Networks with Pruning, Trained Quantization and Huffman Coding", https://arxiv.org/pdf/1510.00149v5.pdf, retrieved Jul. 21, 2017, pp. 1-12.

Han Song et al., "EIE: Efficient Inference Engine on Compressed Deep Neural Network", 2013 21$^{st}$ International Conference on Program Comprehension (ICPC); [International Symposium on Computer Architecture. (ISCA), IEEE, US, Jun. 18, 2016, pp. 243-254.

Jiecao Yu et al., "Scalpel", Proceedings of the 44$^{th}$ Annual International Symposium on Computer Architecture, ISCA '17, ACM Press, New York, New York, USA, Jun. 24, 2017, pp. 548-560.

Hengyuan Hu, "Network Trimming: A Data-Driven Neuron Pruning Approach towards Efficient Deep Architectures", ARXIV.org, Cornell University Library, , Ithica, NY 14853, Jul. 12, 2016, pp. 1-8.

Srivastava, Nitish et al., "Dropout: A simple Way to Prevent Neural Networks from Overfitting", Journal of Machine Learning Research 15 (2014) 1929-1958, published Jun. 2014, pp. 1929-1958.

Tianxing He et al., "Reshaping Deep Neural Network For Fast Decoding By Node-Pruning", 2014 IEEE International Conference on Acoustic, Speech and Signal Processing (ICASSP), pp. 245-249.

PCT/GB2018/051709: International Search Report and Written Opinion, dated Sep. 27, 2018, 15 pages.

Buluc, et al, "Parallel Sparse Martrix-Vector and Matrix-Transpose-Vector Multiplication Using Compressed Sparse Blocks," Parallelism in Algorithms and Architectures, ACM, 2 Penn Plaza, Suite 701, New York, NY10121-0701USA, Aug. 11, 2009 (Aug. 11, 2009), pp. 233-244.

Notification of Transmittal of the International Search Report and the Written Opinion of the International Searching Authority, or Declaration, App. No. PCT/GB2018/051708, dated Sep. 26, 2018, 17 Pages.

Notification Concerning Transmittal of International Preliminary Report on Patentability, App. No. PCT/GB2018/051708, dated Jan. 2, 2020, 10 Pages.

Notification Concerning Transmittal of International Preliminary Report on Patentability, App. No. PCT/GB2018/051709, dated Jan. 2, 2020, 8 Pages.

Togelius, et al, "Learning What to Ignore: Memetic Climbing In Topology And Weight Space," Congress on Evolutionary Computation, 978-1-4244-1823-7/08, IEEE, 2008, pp. 3274-3281.

Office Action, U.S. Appl. No. 15/629,560, dated Mar. 30, 2020, 53 Pages.

Response to Office Action, U.S. Appl. No. 15/629,560, filed Jun. 30, 2020, 41 Pages.

Final Office Action, U.S. Appl. No. 15/629,560, dated Oct. 14, 2020, 47 Pages.

Response to Final Office Action, U.S. Appl. No. 15/629,560, filed Dec. 14, 2020, 26 Pages.

Advisory Action, U.S. Appl. No. 15/629,560, dated Dec. 23, 2020, 5 Pages.

RCE Amendment, U.S. Appl. No. 15/629,560, filed Jan. 14, 2021, 34 Pages.

Office Action, U.S. Appl. No. 15/629,560, dated Feb. 3, 2021, 43 Pages.

Response to Office Action, U.S. Appl. No. 15/629,560, filed Apr. 27, 2021, 29 Pages.

Final Office Action, U.S. Appl. No. 15/629,560, dated May 5, 2021, 39 Pages.

Han, et al, "Deep Compression: Compressing Deep Neural Network with Pruning, Trained Quantization and Huffman Coding," https://arxiv.org/abs/1510.00149v2, 2016, 11 Pages.

Togelius, et al, "Learning What to Ignore: Memetic Climbing in Topology and Weight space," IEEE, 2014, 8 Pages.

Yang, et al, "Object Detection and Viewpoint Estimation with Auto-masking Neural Network," ECCV 2014, Part III, LNCS 8691, pp. 441-455.

Gao, et al, "Deepcloak: Masking Deep Neural Network Models for Robustness Against Adversarial Samples," https://arxiv.org/abs/1702.06763, 2017, 8 Pages.

Response to Final Office Action, U.S. Appl. No. 15/629,560, filed Jul. 2, 2021, 27 Pages.

Advisory Action, U.S. Appl. No. 15/629,560, dated Jul. 16, 2021, 5 Pages.

RCE/Amedment, U.S. Appl. No. 15/629,560, filed Aug. 5, 2021, 28 Pages.

Office Action, U.S. Appl. No. 15/629,560, dated Aug. 17, 2021, 43 Pages.

Wang, et al, "STCT: Sequentially Training Convolutional Networks for Visual Tracking," IEEE Xplore, 2016 (Year: 2016), 9 Pages.

Han, Song et al., "Learning both Weights and Connections for Efficient Neural Networks", NIPS'15 Proceedings of the 28$^{th}$ International Conference on Neural Information Processing Systems, pp. 1135-1143, Montreal, Canada, Dec. 7-12, 2015.

\* cited by examiner

SYSTEMS AND DEVICES FOR FORMATTING NEURAL NETWORK PARAMETERS

BACKGROUND

Field

Subject matter disclosed herein may relate to storage of signals and/or states representative of parameters in a computing device, and may relate more particularly to formatting signals and/or states representative of neural network parameters in a computing device.

Information

Integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of relatively larger amounts of content may prove to be relatively resource-demanding, which may present a number of challenges including, for example, increased processing time, storage demands, complexity, cost, and/or the like.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
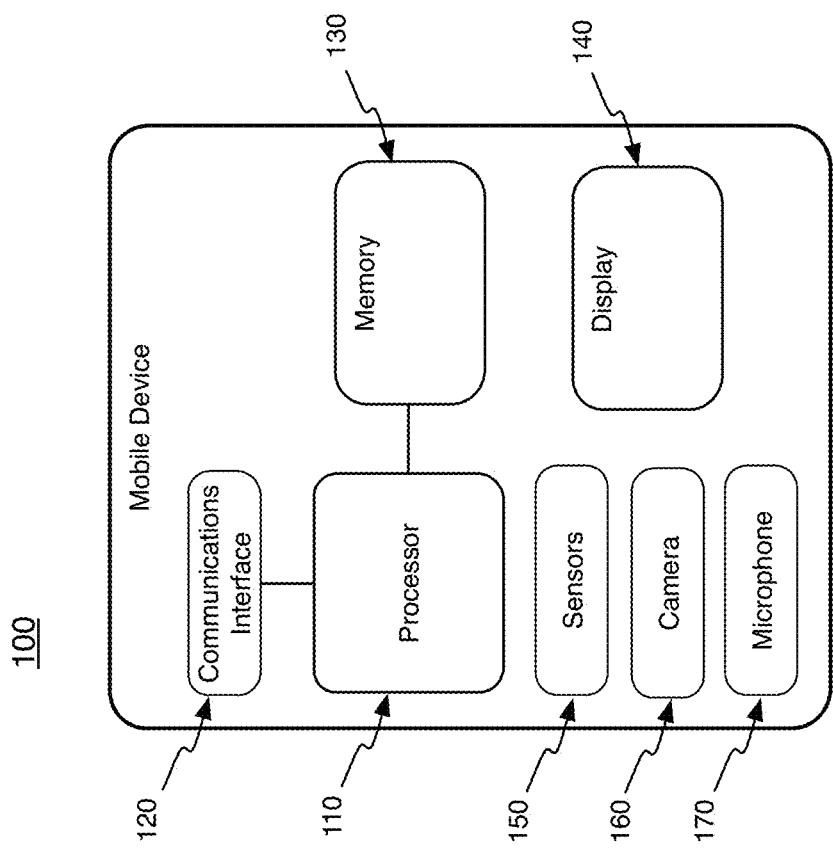
FIG. 1 is an illustration of an example mobile device, in accordance with an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the patent application, particular context of description and/or usage provides helpful guidance regarding reasonable inferences to be drawn; however, likewise, "in this context" in general without further qualification refers to the context of the present patent application.

As mentioned, integrated circuit devices, such as processors, for example, may be found in a wide range of electronic device types. For example, one or more processors may be used in mobile devices, such as cellular phones, for example, as well as in computers, digital cameras, tablet devices, personal digital assistants, wearable devices, etc. Mobile devices and/or other computing devices, for example, may include integrated circuit devices, such as processors, to process signals and/or states representative of a diverse of content types for a variety of purposes. With an abundance of diverse content being accessible, signal and/or state processing techniques continue to evolve. At times, however, processing signals and/or states representative of relatively larger amounts of content may prove to be relatively resource-demanding, which may present a number of challenges including, for example, increased processing time, storage demands, complexity, cost, and/or the like.

For example, neural networks may find increasing utility in a range of applications including speech recognition, computing device vision applications (e.g., facial recognition, handwriting recognition, etc.), and/or natural language processing, to name but a few examples. Relatively large neural network models, such as Deep Neural Network (DNN) models, for example, may utilize considerable memory storage space, memory interface bandwidth, and/or computing resources, for example. Such utilization of computing resources may pose challenges for mobile devices, embedded systems, and/or other resource-constrained computing devices, for example.

FIG. 1 is an illustration of an embodiment 100 of an example mobile device, in accordance with an embodiment. In an embodiment, a mobile device, such as 100, may comprise one or more processors, such as processor 110, and/or may comprise one or more communications interfaces, such as communications interface 120. In an embodiment, one or more communications interfaces, such as communications interface 120, may enable wireless communications between a mobile device, such as mobile device 100, and one or more other computing devices. In an embodiment, wireless communications may occur substantially in accordance any of a wide range of communication protocols, such as those mentioned herein, for example.

In an embodiment, a mobile device, such as mobile device 100, may include a memory, such as memory 130. In an embodiment, memory 130 may comprise a non-volatile memory, for example. Further, in an embodiment, a memory, such as memory 130, may have stored therein executable instructions, such as for one or more operating systems, communications protocols, and/or applications, for example. Further, in an embodiment, a mobile device, such as mobile device 100, may comprise a display, such as display 140, one or more sensors, such as one or more sensors 150, one or more cameras, such as one or more cameras 160, and/or one or more microphones, such as microphone 170, for example. In an embodiment, one or more sensors, such as 150, may comprise one or more accelerometers, gyroscopes, thermometers, magnetometers, barometers, light sensors, or proximity sensors, or a combination thereof. Of course, these are merely example types of components that may be included in a mobile device, and claimed subject matter is not limited in scope to these particular examples.

As mentioned, relatively large neural network models, such as Deep Neural Network (DNN) models, for example, may utilize considerable memory storage space, memory interface bandwidth, and/or other computing resources, for example. Such utilization of computing resources may pose challenges for mobile devices, such as mobile device 100, for example. In some circumstances, neural network models, such as deep neural network (DNN) models, may include relatively significant redundancy, such as, for example, with respect to weight parameters that may make up, at least in part, vectors and/or multidimensional matrices representative of various inputs, outputs, connections and/or nodes of a neural network model, for example. In some circumstances, weight parameters in neural network models and/or systems may be intended to model, at least in part, synapses between biological neurons. Of course, neural network models may be employed in a wide range of applications, and are not limited to modeling biological systems. Reducing redundancy, such as with respect to neural network weight parameters, for example, may lead to improvements in efficient utilization of computing resources. For example, improvements in efficient utilization of computing resources for neural networks may lead to increased utility of neural networks in mobile devices, such as mobile device 100, and/or in other resource-constrained computing devices.

In some circumstances, neural network weight parameter pruning operations may be utilized to remove redundant weight parameters within a neural network. As utilized herein, the term "redundant" in connection with a neural network weight parameter and/or the like refers to a weight parameter and/or the like that may be removed from a neural network model while maintaining a specified level of accuracy, such as after retraining operations, for example. In an embodiment, importance parameters may be determined for respective weight parameters and/or groups of weight parameters. Weight parameters and/or groups of weight parameters having importance parameters below a specified threshold value may be removed, in an embodiment. As utilized herein, the term "importance parameter" refers to a parameter for a respective weight parameter and/or a respective group of weight parameters that may be compared against a threshold value, such as to determine whether a weight parameter and/or group of weight parameters are to be removed. Also, the terms "weight parameter," "neural network weight parameter," "importance parameter," and/or the like are merely convenient labels, and are to be associated with appropriate physical quantities.

In an embodiment, by removing weight parameters and/or groups of weight parameters determined to be redundant, a related reduction in computing resource utilization may result. For example, removal of redundant weight parameters may lead to a corresponding reduction in an amount of multiply-accumulate processor operations to be performed. Also, at least in part as a result of weight parameter pruning operations, matrices including weight parameters for various inputs, outputs, connections, and/or nodes of a neural network model may become sparse. In some circumstances, sets of neural network weight parameters, for example, may be stored in a sparse matrix format, such as, for example, a Compressed Sparse Rows (CSR) format, as discussed more fully below.

Figure 2:
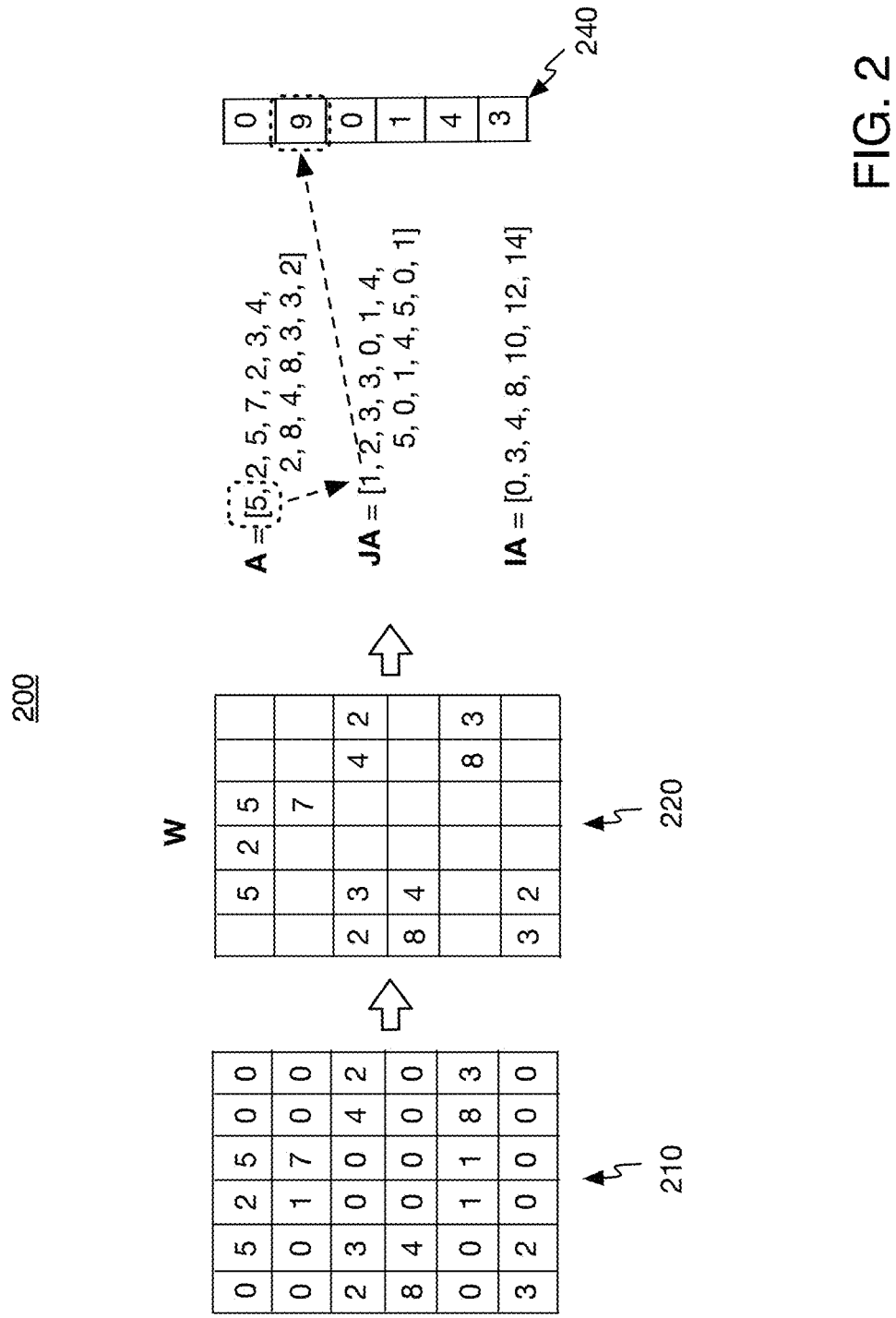
FIG. 2 is an illustration of an example process for formatting a set of neural network weight parameters, in accordance with an embodiment.

FIG. 2 is an illustration of an embodiment 200 of an example process for formatting a set of neural network weight parameters, in accordance with an embodiment. In an embodiment, such as example embodiment 200, a relatively dense matrix, such as matrix 210, may include weight parameters, such as may be associated with one or more nodes, connections, and/or layers, for example, of a neural network model. As mentioned above, neural network weight parameter pruning operations may be utilized to remove redundant weight parameters within a neural network. In an embodiment, such as embodiment 200, a relatively sparse set of weight parameters, such as sparse matrix 220, may result from neural network weight pruning operations.

In some circumstances, to store a relatively sparse set of weight parameters, such as sparse matrix 220, in at least one memory of at least one computing device, for example, a relatively sparse set of weight parameters, such as sparse matrix 220, may be stored in a CSR format. For example, a relatively sparse m×n matrix W, such as 220, may be stored as signals and/or states representative of three one-dimensional arrays, such as arrays A, JA, and/or IA of embodiment 200. For example, array A may include neural network weight parameters, such as neural network weight parameters having an importance parameter determined to meet and/or exceed a specified threshold parameter. For example, array A may include weight parameters from a set of neural network weight parameters, such as relatively sparse matrix W. Array IA may record indices into array A of the first elements of individual rows of matrix W. Array JA, for example, may store column indices for individual weight parameters of array A. For example, a weight parameter of value "5," such as depicted at the $0^{th}$ row, $1^{st}$ column (counting from row 0 to row 5 and column 0 to column 5) of example matrix 220, may be stored in a CSR format by storing the value "5" in array A (depicted as the $0^{th}$ element of array A for this example) and/or by storing a value "1" in array JA (depicted as the $0^{th}$ element of array JA for this example), indicating that the weight parameter of value "5" for this example represents a value from the 1$^{st}$ column of matrix 220. Further, for example, a value "0" may be stored in array IA, indicating that for the 0$^{th}$ row of example matrix 220 the first weight parameter may be located at the 0$^{th}$ position of array A.

To perform multiplication operations, for example, involving a matrix, such as example matrix 220, and an input vector, such as input vector 240, for example, a processor, such as processor 110, may access arrays A, JA, and/or IA to determine an appropriate weighting parameter to apply to an input vector, such as input vector 240, for example, such as illustrated at least in part by the arrows depicted in FIG. 2.

In some circumstances, utilization of a CSR format for sets of neural network weight parameters may pose some challenges. For example, an amount of overhead that may be involved in storing sets of neural network weight parameters in a CSR format may be relatively inefficient, such as may be due, for example, to an array, such as array JA, being of the same size as an array, such as array A, storing the actual weighting parameters. That is, more than half of content stored using a CSR format may be dedicated to indicating a format for a set neural network weight parameters, while less than half of content stored may include the neural network weight parameters themselves. Thus, utilization of a CSR format for sets of neural network weight parameters may be relatively inefficient with respect to memory and/or storage resources.

Additionally, in some circumstances, utilization of a CSR format for sets of neural network weight parameters may lead to relatively inefficient computing resource utilization. For example, to perform a multiplication operation, such as a sparse matrix-vector multiplication between a matrix, such as example matrix 220, and an input vector, such as input vector 240, a processor, such as processor 110, may load a weight parameter from an array, such as array A, may load an index value from an array, such as array JA, and may utilize an index value, such as from array JA, to load an appropriate value from an input vector, such as input vector 240. For example, as illustrated at least in part by the arrows depicted in FIG. 2, a processor, such as processor 110, may load a weight parameter of value "5" from array A, may load an index of value "1" from array JA, and may utilize the index value of "1" fetched from array JA to load a value "9" as the 1$^{st}$ element of input vector 240. Such indexing of input values, for example, may involve additional computation and/or memory accesses, thereby potentially negatively affecting system performance and/or computing resource utilization efficiency. Further, at least in part as a result of the irregular structure of relatively sparse sets of weight parameters, such as sparse matrix 220, improvements in computing performance and/or improvements in computing resource utilization efficiency that may otherwise be available for use with relatively dense sets of weight parameters, such as matrix 210, may not be available for use with relatively sparse sets of weight parameters, such as matrix 220.

To address, at least in part, challenges presented by utilization of a CSR format for sets of neural network weight parameters, embodiments in accordance with claimed subject matter may include formatting neural network weighting parameters in groups, for example, as explained more fully below. Further, in an embodiment, neural network weight parameters of a particular group may share the same column index, thereby reducing overhead of storing relatively sparse matrices, such as sets of neural network weight parameters, and/or thereby reducing an amount of computations and/or memory accesses related to sparse matrix operations, such as operations related to sets of neural network weight parameters.

Figure 3:
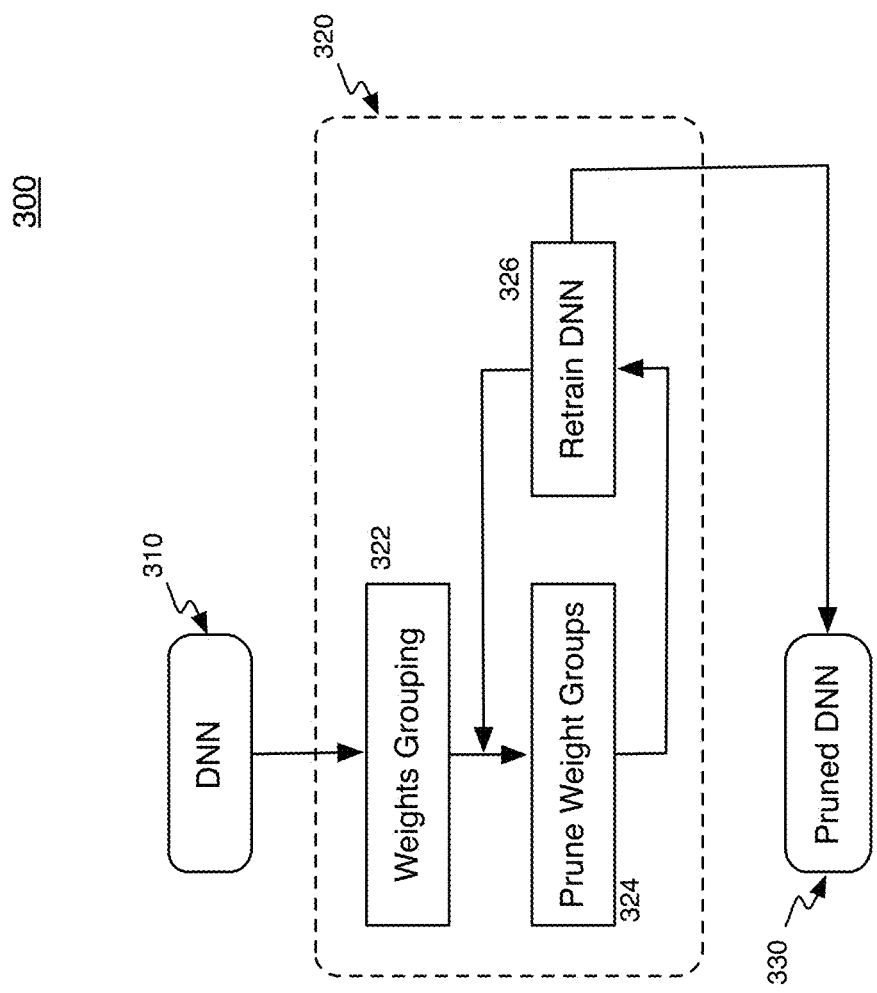
FIG. 3 is a schematic block diagram depicting an example process for formatting a set of neural network weight parameters, in accordance with an embodiment.

FIG. 3 is a schematic block diagram depicting an embodiment 300 of an example process for formatting a set of neural network weight parameters. In an embodiment, signals and/or states representative of a set of neural network weight parameters (e.g., parameters related to a DNN model), such as a set of neural network weight parameters 310, for example, may be retrieved from at least one memory of at least one computing device. Embodiments in accordance with claimed subject matter may include all of blocks 310-330, less than blocks 310-330, or more than blocks 310-330. Also, the order of blocks 310-330 is merely an example order, and claimed subject matter is not limited in scope in these respects.

In an embodiment, signals and/or states representative of a set of neural network weight parameters, such as set of neural network weight parameters 310, may be processed to group the set of neural network weight parameters into a plurality of weight groups according to a specified group size, such as depicted at block 322, for example. In an embodiment, groups of neural network weighting parameters may be of identical size, although the scope of claimed subject matter is not limited in scope in this respect. Also, in an embodiment, a group size may be specified to match that of a single instruction, multiple data (SIMD) executable instruction width. For example, a processor, such as processor 110 (e.g., Cortex-M4 type processor from ARM, LTD), may implement a SIMD width of two (i.e., two content elements per executable instruction). For example, for a SIMD width of two, individual groups of neural network weight parameters may include two neural network weight parameters, although, again, the scope of claimed subject matter is not limited to these specific examples. Additionally, as mentioned above and as explained below, neural network weight parameters of a particular group may share the same column index.

Further, in an embodiment, groups of neural network weight parameters may be pruned, as depicted at block 324. In an embodiment, pruning groups of neural network weight parameters may include calculating importance parameters for respective groups of neural network weight parameters. For example, calculating importance parameters for respective groups of neural network weight parameters may include calculating root-mean-square (RMS) parameters for the respective groups, for example. Additionally, pruning groups of neural network weight parameters may include removing one or more groups determined to have an importance parameter below a specified threshold value, as further explained below.

Further, as depicted at block 326, for example, a grouped and/or pruned set of network weight parameters may be retrained, for example to maintain a desired and/or specified level of accuracy within the neural network model. In an embodiment, a process of grouping and/or pruning sets of neural network weight parameters and retraining the grouped and/or pruned sets of neural network weight parameters may be performed in an iterative fashion, such as until a calculated accuracy parameter is determined to fall below a specified threshold, for example. Also, in an embodiment, pruned and/or retrained sets of neural network weight parameters may be formatted according to a grouped compressed sparse row format, as explained more fully below.

Figure 4:
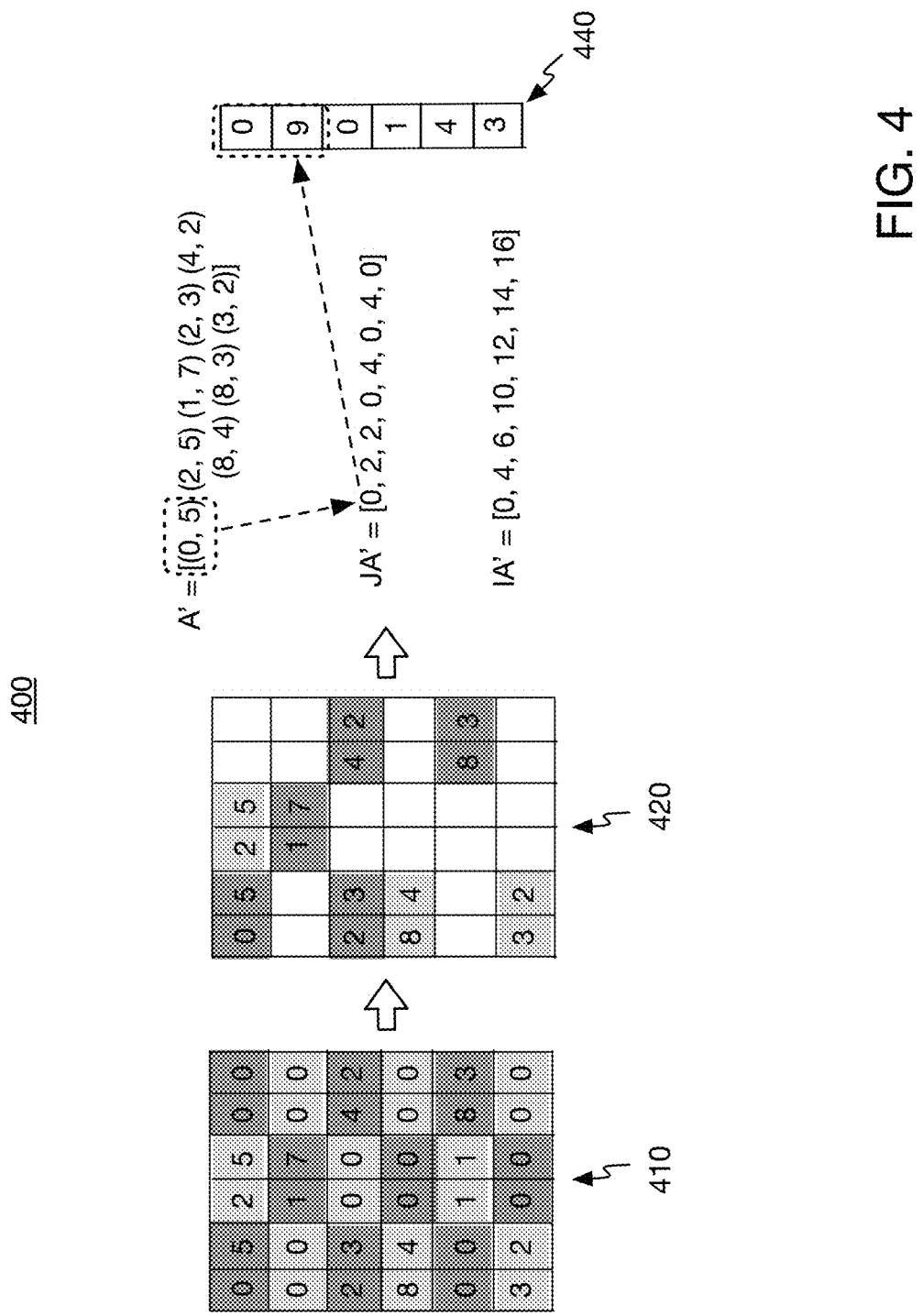
FIG. 4 is an illustration of an example process for formatting a set of neural network weight parameters, in accordance with an embodiment.

FIG. 4 is an illustration of an embodiment 400 of an example process for formatting a set of neural network weight parameters. In an embodiment, such as example embodiment 400, a relatively dense set of parameters, such as matrix 410, may include weight parameters, such as may be associated with one or more nodes, connections, and/or layers, for example, of a neural network model. For example embodiment 400, matrix 410 may include the same neural network weight parameters as depicted in matrix 210 of FIG. 2. In an embodiment, signals and/or states representative of a set of neural network weight parameters, such as matrix 410, may be processed to group the set of neural network weight parameters into a plurality of groups according to a specified group size. For example, neural network weight parameters of matrix 410, for example, may be grouped into groups of two, as depicted via gray scale shading in FIG. 4. Although example embodiments described herein discuss and/or depict weight groups of size two, claimed subject matter is not limited in scope in this respect. As mentioned above, a group size may be specified to match that of a SIMD width, although, again, claimed subject matter is not limited in scope in this respect.

Further, in an embodiment, groups of neural network weight parameters may be pruned, such as depicted at matrix 420, for example. In an embodiment, pruning groups of neural network weight parameters may include calculating importance parameters, such as via RMS calculation, for respective groups of neural network weight parameters, and/or may include removing groups determined to have an importance parameter below a specified threshold value. In an embodiment, an importance value threshold may be specified as the value "1," although claimed subject matter is not limited in scope in this respect. For example embodiment 400 depicted in FIG. 4, matrix 420 may represent a set of neural network weight parameters resulting from example grouping and/or pruning processes described herein. Matrix 420 may, for example, represent a grouped and/or pruned set of neural network weight parameters that may be retrained, such as explained above, in an embodiment.

In an embodiment, a grouped compressed sparse row (GCSR) format may be utilized to store signals and/or states representative of grouped, pruned, and/or retrained sets of neural network weight parameters in at least one memory, such as memory 130, of at least one computing device, such as mobile device 100. In an embodiment, multiple arrays may be utilized to store signals and/or states representative of a set of neural network weight parameters. For example, an array, such as array A' of embodiment 400 depicted in FIG. 4, may store groups of neural network weight parameters, such as groups of neural network weight parameters having an importance parameter determined to meet and/or exceed a specified threshold. In an embodiment, an array, such as array A', may store weight group parameters indicated and/or specified by a matrix W, such as matrix 420, for example. In an embodiment, an array, such as array A', may store weight group parameters in a particular order, such as indicated and/or specified by a matrix, such as matrix 420, for example. Further, an array, such as IA', may store parameters representative of indices into an array, such as A', of first elements of individual rows of a matrix W, such as matrix 420, in an embodiment. Additionally, in an embodiment, an array, such as JA', may store parameters representative of column indices for individual groups of weight parameters. As mentioned previously, neural network weight parameters of a particular weight group may share a column index, in an embodiment. For example, a group of neural network weight parameters of values (0, 5), such as depicted at the $0^{th}$ row, $0^{th}$ column of example matrix 420, may be stored in a GCSR format by storing the values "0, 5" in array A' and/or by storing a value "0" in array JA' (depicted as the $0^{th}$ element of array JA' for this example). Further, for example, a value "0" may be stored in array IA', indicating that for the $0^{th}$ row of example matrix 420 the first group of weight parameters may be located at the $0^{th}$ position of array A'.

In an embodiment, column indices for the first parameters of individual groups of neural network weight parameters may be stored, such as in array JA', rather than store column indices for individual weight parameters. By indexing according to groups rather than according to individual weight parameters, memory and/or storage and/or other computing resources may be more efficiently utilized. Similarly, computing resources that may be utilized to perform neural network operations may be reduced.

For example, to perform a multiplication operation, such as a sparse matrix-vector multiplication between a matrix, such as example matrix 420, and an input vector, such as input vector 440, a processor, such as processor 110, may load parameters from a group of neural network weight parameters from an array, such as array A' and may load multiple input values, such as according to a group size, for example, from an input vector based, at least in part, on an index value loaded from an array, such as array JA'. For example, as illustrated at least in part by the arrows depicted in FIG. 4, a processor, such as processor 110, may load parameters of values "0, 5" from array A', and may utilize the index value of "0" fetched from array JA' to load values "0, 9" from input vector 440. Thus, by grouping neural network weighting parameters, such as part of a pruning process, for example, fewer memory accesses may be performed and/or fewer calculations may be performed for neural network matrix-matrix and/or matrix-vector operations, for example. Further, by grouping neural network weight parameters according to SIMD width, for example, fewer instructions may be executed, again improving computing resource utilization efficiency.

Figure 5:
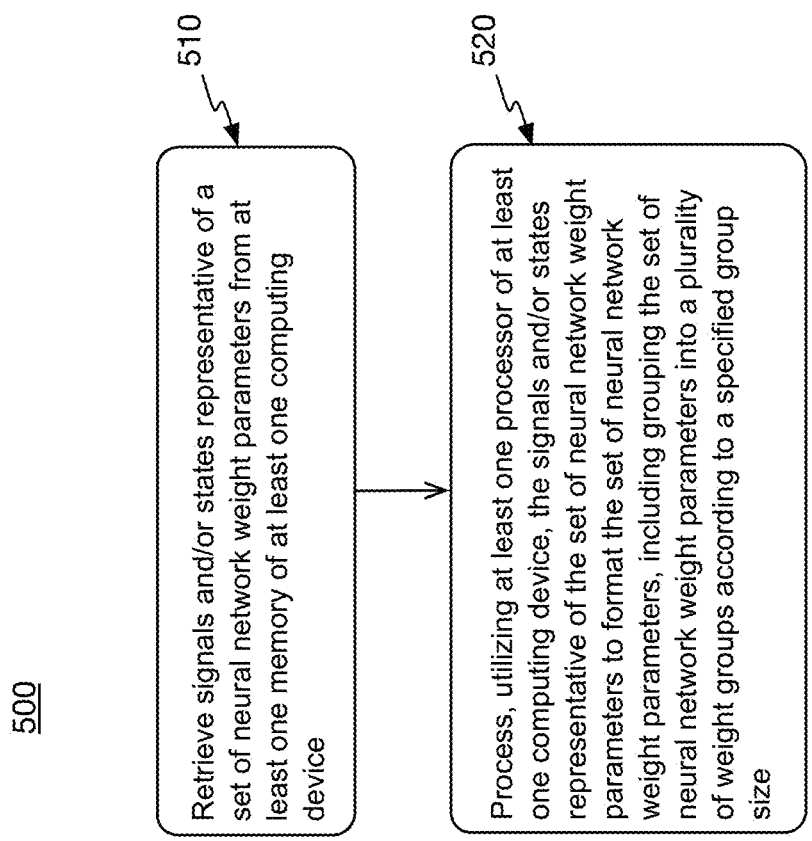
FIG. 5 is an illustration of an example process for formatting signals and/or states representative of neural network weight parameters, in accordance with an embodiment.

FIG. 5 is an illustration of an embodiment 500 of a process for formatting signals and/or states representative of neural network parameters. Embodiments in accordance with claimed subject matter may include all of blocks 510-520, less than blocks 510-520, or more than blocks 510-520. Also, the order of blocks 510-520 is merely an example order, and claimed subject matter is not limited in scope in these respects.

As depicted at block 510, signals and/or states representative of a set of neural network weight parameters may be retrieved from at least one memory of at least one computing device, in an embodiment. Also in an embodiment, such as depicted at block 520, the signals and/or states representative of the set of neural network weight parameters may be processed, utilizing at least one processor of the at least one computing device, to format the set of neural network weight parameters, including grouping the set of neural network weight parameters into a plurality of weight groups according to a specified group size.

In an embodiment, grouping the set of neural network weight parameters according to the specified group size may include grouping the set of neural network weight parameters according to a single instruction, multiple data (SIMD) width. For example, as discussed above in connection with FIG. 4, a group size of two may be specified to match a SIMD width of two, although claimed subject matter is not limited in scope in this respect.

Further, in an embodiment, processing signals and/or states representative of a set of neural network weight parameters, such as to format the set of neural network weight parameters, may include calculating a plurality of importance parameters for respective weight groups of a plurality of weight groups. In an embodiment, calculating importance parameters for respective weight groups may include calculating root-mean-square (RMS) parameters for the respective weight groups, for example.

Additionally, in an embodiment, processing signals and/or states representative of a set of neural network weight parameters, such as to format the set of neural network weight parameters, may include removing one or more weight groups of the plurality of weight groups having an importance parameter below a specified threshold parameter. Further, in an embodiment, a formatted set of network weight parameters may be retrained, for example to maintain a desired level of accuracy within the neural network model. For example, in an embodiment, processing signals and/or states representative of a set of neural network weight parameters may include iteratively formatting and retraining the set of neural network weight parameters until a calculated accuracy parameter is determined to fall below a specified threshold. As discussed above, pruning operations may include grouping weighting parameters, such as according to a SIMD width, for example.

An embodiment, such as embodiment 500, of a process for grouping signals and/or states representative of neural network parameters may include processing signals and/or states representative of a formatted and retrained set of neural network weight parameters to reformat the pruned and/or retrained set of neural network weight parameters according to a grouped compressed sparse row format. In an embodiment, processing signals and/or states representative of a formatted and/or retrained set of neural network weight parameters to reformat the formatted and/or retrained set of neural network weight parameters according to a grouped compressed sparse row format may include generating a first array of parameters representative of one or more weight groups of the plurality of weight groups determined to have importance parameters exceeding a specified threshold value, generating a second array of parameters representative of a plurality of indices into the first array of parameters, and a third array of parameters representative of column indices for individual weight groups of the plurality of weight groups of the formatted and retrained set of neural network weight parameters.

Further, an embodiment, such as embodiment 500, of a process for formatting signals and/or states representative of neural network parameters may include storing signals and/or states representative of a group compressed sparse row formatted set of neural network weight parameters in at least one memory of at least one computing device.

In the context of the present patent application, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later. Also, the term "connection" may be utilized in a context of a neural network model, and may, in an embodiment, refer to parameters passed between nodes that may include parameters and/or sets of parameters representative of output values, for example. Also, in an embodiment, connections between nodes may include weight parameters. For example, one or more weight parameters may operate in a specified manner on one or more parameters representative of one or more output values to yield a connection, such as between a node of a first layer and a node of a second layer, in an embodiment, for example.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Additionally, in the present patent application, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance, between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modeled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices and/or one or more server devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device and/or a client device, as well as other types of devices, including between wired and/or wireless devices coupled via a wired and/or wireless network, for example. An example of a distributed computing system comprises the so-called Hadoop distributed computing system, which employs a map-reduce type of architecture. In the context of the present patent application, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present patent application, use of the term "Hadoop" is intended to include versions, presently known and/or to be later developed.

In the context of the present patent application, the term network device refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present patent application, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present patent application, the term "transparent," if used with respect to devices of a network, refers to devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes and/or, thus, may include within the network the devices communicating via the one or more intermediate nodes and/or the one or more intermediate devices of the one or more intermediate nodes, but may engage in signal communications as if such intermediate nodes and/or intermediate devices are not necessarily involved. For example, a router may provide a link and/or connection between otherwise separate and/or independent LANs.

In the context of the present patent application, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present patent application that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present patent application, may comprise a service that organizes stored digital content, such as, for example, text, images, video, etc., through the use of hypermedia, for example. It is noted that a network, such as the Internet and/or Web, may be employed to store electronic files and/or electronic documents.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the term "Web site" and/or similar terms refer to Web pages that are associated electronically to form a particular collection thereof. Also, in the context of the present patent application, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wide-band Code Division Multiple Access (WCDMA), Bluetooth, ultra-wideband (UWB), 802.11b/g/n, and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 6:
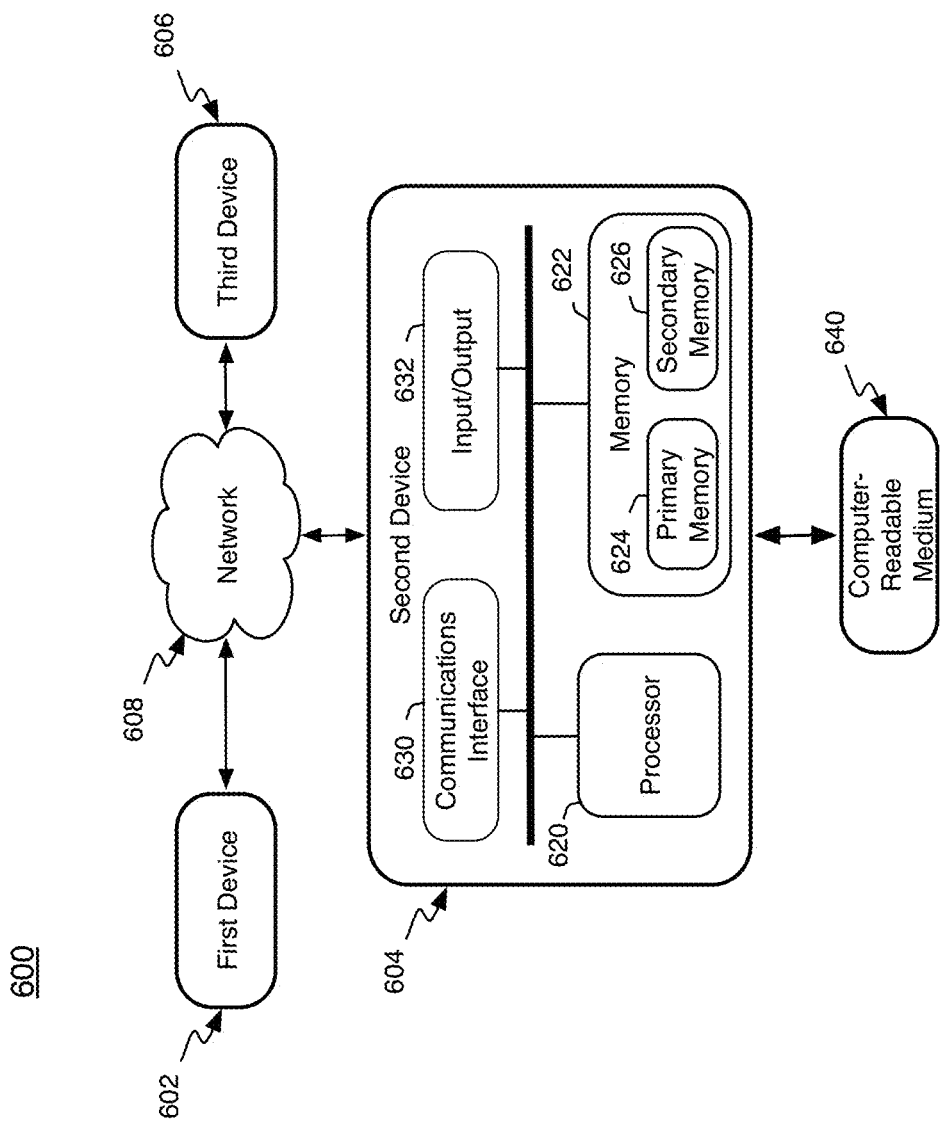
FIG. 6 is a schematic block diagram of an example computing device, in accordance with an embodiment.

In one example embodiment, as shown in FIG. 6, a system embodiment may comprise a local network (e.g., device 604 and medium 640) and/or another type of network, such as a computing and/or communications network. For purposes of illustration, therefore, FIG. 6 shows an embodiment 600 of a system that may be employed to implement either type or both types of networks. Network 608 may comprise one or more network connections, links, processes, services, applications, and/or resources to facilitate and/or support communications, such as an exchange of communication signals, for example, between a computing device, such as 602, and another computing device, such as 606, which may, for example, comprise one or more client computing devices and/or one or more server computing device. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present patent application at least, this is understood to refer to sufficient structure within the meaning of 35 USC § 112 (f) so that it is specifically intended that 35 USC § 112 (f) not be implicated by use of the term "computing device" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-5, for example, and in the text associated with the foregoing figure(s) of the present patent application.

An embodiment in accordance with claimed subject matter may include a method of executing computer instructions on at least one computing device without further human interaction in which the at least one computing device includes at least one processor and at least one memory. An embodiment may include fetching computer instructions from the at least one memory of the at least one computing device for execution on the at least one processor of the at least one computing device, executing the fetched computer instructions on the at least one processor of the at least one computing device, and storing in the at least one memory of the at least one computing device any results of having executed the fetched computer instructions on the at least one processor of the at least one computing device. In an embodiment, the computer instructions to be executed comprise instructions for formatting neural network weight parameters, wherein executing the fetched instructions further includes retrieving signals and/or states representative of a set of neural network weight parameters from at least one memory of at least one computing device, and processing, utilizing at least one processor of the at least one computing device, signals and/or states representative of a set of neural network weight parameters to format a set of neural network weight parameters, including grouping a set of neural network weight parameters into a plurality of weight groups according to a specified group size.

In an embodiment, an apparatus may include at least one computing device, the at least one computing device including at least one processor and at least one memory, the at least one computing device to execute computer instructions on the at least one processor without further human intervention. In an embodiment, the computer instructions to be executed may be fetched from the at least one memory for execution on the at least one processor, and the at least one computing device may store in the at least one memory of the at least one computing device any results to be generated from the execution on the at least one processor of the to be executed computer instructions. In an embodiment, the computer instructions to be executed may include instructions for formatting neural network weight parameters, wherein the instructions to be executed as a result of execution may retrieve signals and/or states representative of a set of neural network weight parameters from at least one memory of at least one computing device, and may process signals and/or states representative of a set of neural network weight parameters to format a set of neural network weight parameters, to include to group a set of neural network weight parameters into a plurality of weight groups according to a specified group size.

Referring now to FIG. 6, in an embodiment, first and third devices 602 and 606 may be capable of rendering a graphical user interface (GUI) for a network device and/or a computing device, for example, so that a user-operator may engage in system use. Device 604 may potentially serve a similar function in this illustration. Likewise, in FIG. 6, computing device 602 ('first device' in figure) may interface with computing device 604 ('second device' in figure), which may, for example, also comprise features of a client computing device and/or a server computing device, in an embodiment. Processor (e.g., processing device) 620 and memory 622, which may comprise primary memory 624 and secondary memory 626, may communicate by way of a communication bus 615, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 604, as depicted in FIG. 6, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 6, computing device 602 may provide one or more sources of executable computer instructions in the form physical states and/or signals (e.g., stored in memory states), for example. Computing device 602 may communicate with computing device 604 by way of a network connection, such as via network 608, for example. As previously mentioned, a connection, while physical, may not necessarily be tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may be utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described. Generated signals may also be stored in memory, also previously suggested.

Memory 622 may store electronic files and/or electronic documents, such as relating to one or more users, and may also comprise a computer-readable medium that may carry and/or make accessible content, including code and/or instructions, for example, executable by processor 620 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 6, processor 620 may comprise one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method, comprising:
retrieving signals or states representative of a set of neural network weight parameters from at least one memory of at least one computing device;
processing, utilizing at least one processor of the at least one computing device, the signals or states representative of the set of neural network weight parameters to format the set of neural network weight parameters, including
grouping the set of neural network weight parameters into a plurality of weight groups according to a specified group size,
storing the plurality of weight groups in a first array,
storing, in a second array, indices into the first array specifying first weight groups of individual rows of the set of neural network weight parameters for respective weight groups of the plurality of weight groups, and
storing, in a third array, indices specifying individual columns of the set of neural network weight parameters for the respective weight groups of the plurality of weight groups.

2. The method of claim 1, wherein the grouping the set of neural network weight parameters according to the specified group size comprises grouping the set of neural network weight parameters according to a single instruction, multiple data (SIMD) width.

3. The method of claim 1, wherein the processing the signals or states representative of the set of neural network weight parameters to format the set of neural network weight parameters further includes calculating a plurality of importance parameters for the respective weight groups of the plurality of weight groups.

4. The method of claim 3, wherein the calculating the plurality of importance parameters for the respective weight groups of the plurality of weight groups comprises calculating root-mean-square (RMS) parameters for the respective weight groups of the plurality of weight groups.

5. The method of claim 3, wherein the processing the signals or states representative of the set of neural network weight parameters to format the set of neural network weight parameters further comprises removing one or more weight groups of the plurality of weight groups having an importance parameter below a specified threshold parameter.

6. The method of claim 5, further comprising processing the signals or states representative of the formatted set of neural network weight parameters to retrain the formatted set of neural network weight parameters.

7. The method of claim 5, further comprising processing the signals or states representative of the set of neural network weight parameters to iteratively remove the one or more weight groups of the plurality of weight groups having an importance parameter below a specified threshold parameter and retrain the set of neural network weight parameters until a calculated accuracy parameter is determined to fall below a specified threshold.

8. The method of claim 6, further comprising processing signals or states representative of the formatted and retrained set of neural network weight parameters to reformat the formatted and retrained set of neural network weight parameters according to a grouped compressed sparse row format.

9. The method of claim 8, wherein the processing the signals or states representative of the formatted and retrained set of neural network weight parameters to reformat the formatted and retrained set of neural network weight parameters according to the grouped compressed sparse row format comprises:
generating a first set of parameters representative of one or more weight groups of the plurality of weight groups determined to have importance parameters exceeding a specified threshold;
storing the first set of parameters representative of the one or more weight groups of the plurality of weight groups determined to have importance parameters exceeding the specified threshold in the first array;
generating a second set of parameters representative of a plurality of indices into the first array of parameters for individual rows of the formatted and retrained set of neural network weight parameters;
storing the second set of parameters representative of the plurality of indices into the first array of parameters for individual rows of the formatted and retrained set of neural network weight parameters in the second array;
generating a third set of parameters representative of column indices for individual weight groups of the plurality of weight groups of the formatted and retrained set of neural network weight parameters; and
storing, in the third array, the third set of parameters representative of the column indices for the individual weight groups of the plurality of weight groups of the formatted and retrained set of neural network parameters.

10. The method of claim 8, further comprising storing signals or states representative of the grouped compressed sparse row formatted set of neural network weight parameters in the at least one memory of the at least one computing device.

11. An apparatus, comprising:
at least one processor of at least one computing device to retrieve signals or states representative of a set of neural network weight parameters from at least one memory of the at least one computing device, the at least one processor further to process the signals and/or states representative of the set of neural network weight parameters to format the set of neural network weight parameters, wherein, at least in part to format the set of neural network weight parameters, the at least one processor to:
group the set of neural network weight parameters into a plurality of weight groups in accordance with a specified group size;
store the the plurality of weight parameters in a first array;
store, in a second array, indices into the first array to specify first weight groups of individual rows of the set of neural network weight parameters for respective weight groups of the plurality of weight groups; and
store, in a third array, indices to specify individual columns of the set of neural network weight parameters for the respective weight groups of the plurality of weight groups.

12. The apparatus of claim 11, wherein, to group the set of neural network weight parameters in accordance with the specified group size, the at least one processor to group the set of neural network weight parameters in accordance with a single instruction, multiple data (SIMD) width.

13. The apparatus of claim 11, wherein, to process the signals or states representative of the set of neural network weight parameters to format the set of neural network weight parameters, the at least one processor further to calculate a plurality of importance parameters for the respective weight groups of the plurality of weight groups.

14. The apparatus of claim 13, wherein, at least in part to calculate the plurality of importance parameters for the respective weight groups of the plurality of weight groups, the at least one processor to calculate root-mean-square (RMS) parameters for the respective weight groups of the plurality of weight groups.

15. The apparatus of claim 13, wherein, at least in part to process the signals or states representative of the set of neural network weight parameters to format the set of neural network weight parameters, the at least one processor further to remove one or more weight groups of the plurality of weight groups having an importance parameter below a specified threshold parameter.

16. The apparatus of claim 15, wherein the at least one processor further to process the signals or states representative of the formatted set of neural network weight parameters to retrain the formatted set of neural network weight parameters.

17. The apparatus of claim 16, wherein the at least one processor further to process the signals or states representative of the set of neural network weight parameters to iteratively format and retrain the set of neural network weight parameters until a calculated accuracy parameter is determined to fall below a specified threshold.

18. The apparatus of claim 16, wherein the at least one processor further to process the signals or states representative of the formatted and retrained set of neural network weight parameters to format the formatted and retrained set of neural network weight parameters at least in part in accordance with a grouped compressed sparse row format.

19. The apparatus of claim 18, wherein, to process the signals or states representative of the formatted and retrained set of neural network weight parameters to reformat the formatted and retrained set of neural network weight parameters at least in part in accordance with the grouped compressed sparse row format, the at least one processor to:
generate a first set of parameters representative of one or more weight groups of the plurality of weight groups determined to have importance parameters exceeding a specified threshold;
store the first set of parameters representative of the one or more weight groups of the plurality of weight groups determined to have importance parameters exceeding the specified threshold in the first array;
generate a second set of parameters representative of a plurality of indices into the first set of parameters for individual rows of the formatted and retrained set of neural network weight parameters;
store the second set of parameters representative of the plurality of indices into the first array of parameters for individual rows of the formatted and retrained set of neural network weight parameters in the second array;
generate a third set of parameters representative of column indices for individual weight groups of the plurality of weight groups of the formatted and retrained set of neural network weight parameters; and
store, in the third array, the third set of parameters representative of the column indices for the individual weight groups of the plurality of weight groups of the formatted and retrained set of neural network parameters.

20. The apparatus of claim 18, where the at least one processor further to store signals or states representative of the group compressed sparse row formatted set of neural network weight parameters in the at least one memory of the at least one computing device.

\* \* \* \* \*